June 7, 1955 H. P. DUPRE ET AL 2,710,384
SPRING LOADED DISCONNECTING PANEL
Filed July 8, 1949 3 Sheets-Sheet 3
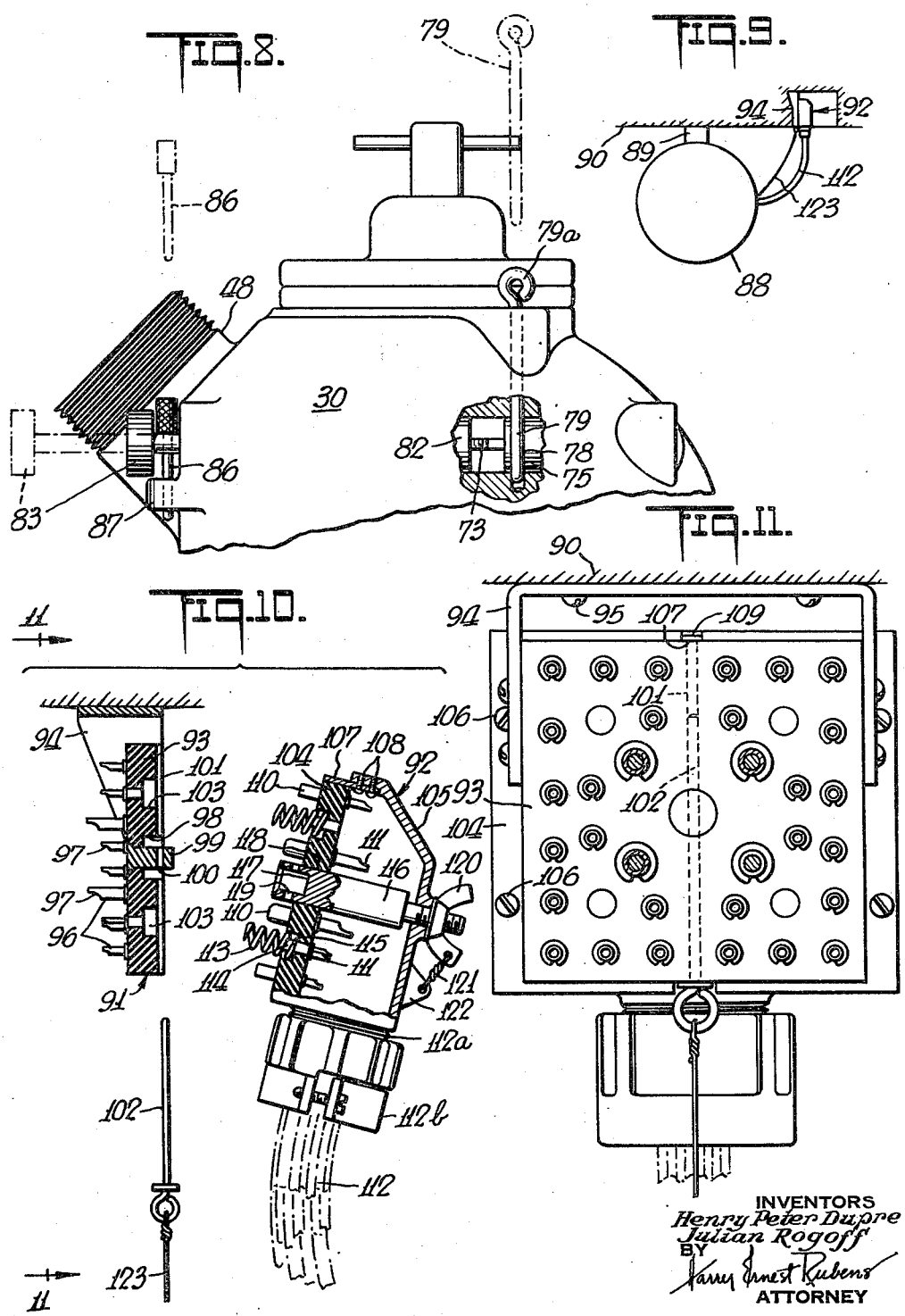
INVENTORS
Henry Peter Dupre
Julian Rogoff
BY
Harry Ernest Rubens
ATTORNEY

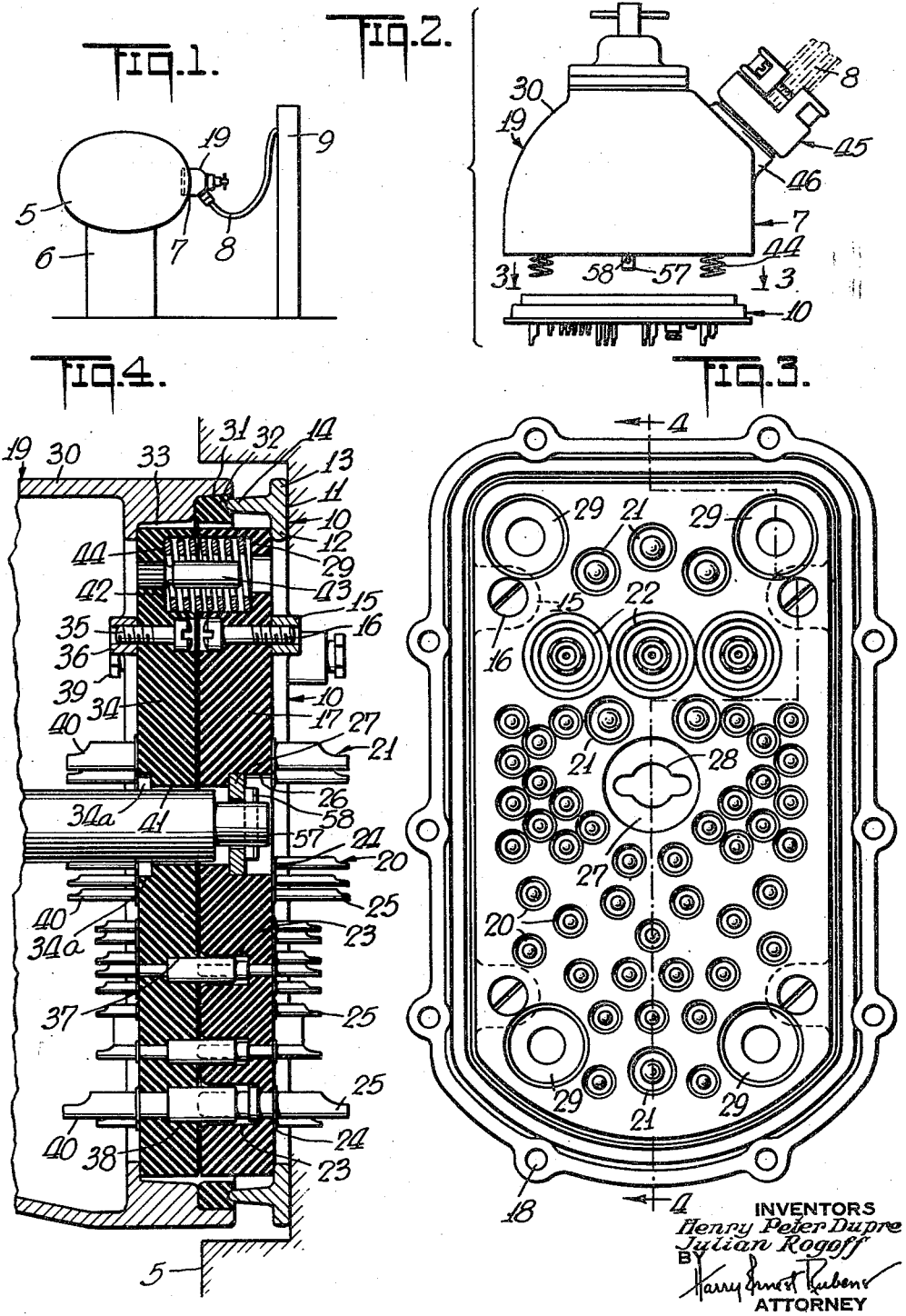

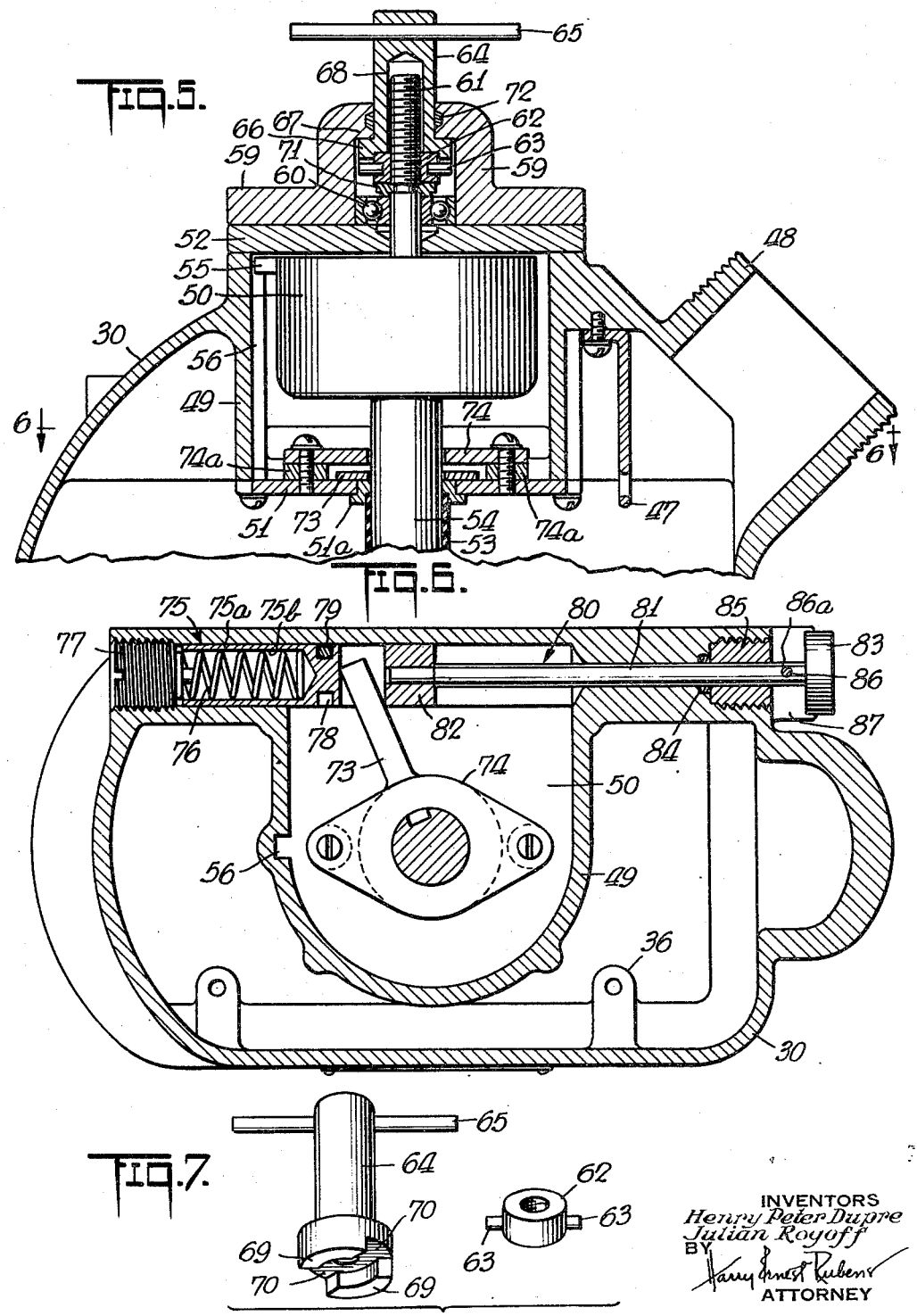

United States Patent Office 2,710,384
Patented June 7, 1955

2,710,384

SPRING LOADED DISCONNECTING PANEL

Henry Peter Dupre, Astoria, and Julian Rogoff, New Rochelle, N. Y., assignors to Burndy Engineering Company, Inc., a corporation of New York Application July 8, 1949, Serial No. 103,714

6 Claims. (Cl. 339—45)

Our invention relates to a disconnecting panel and more particularly to a pair of units attached to each other forming a panel, but capable of being separated by remote control.

Disconnecting panels of this type may be used in the firing of guided missiles, and for controlling expendable fuel tanks on aircraft. The units may be employed for disconnecting electrical or mechanical connections.

The principal objects of our invention are to provide means for manually locking the units with electrical or mechanical means for unlocking them; to provide means between the units, when connected, whereby they may be forcibly and quickly separated from each other when unlocked; to provide a disconnecting panel which may be locked without imparting a thrust to a missile that may affect its ballistic setting; to provide a safety mechanism which will prevent unintentional separation of the units; to provide a weatherproof enclosure for the units which will not permit the mechanical elements to freeze or short circuit the electrical elements; and to provide a simplified electrically operated release mechanism for separating the units.

We accomplish these and other objects and obtain our new results as will be apparent from the device described in the following specification, particularly pointed out in the claims, and illustrated in the accompanying drawing, in which—

Fig. 1 illustrates diagramatically, our disconnecting panel connected to a guided missile.

Fig. 2 is an exploded elevational view of our separated disconnecting panel.

Fig. 3 is a plan view of the bottom unit taken in the plane 3—3 of Fig. 2.

Fig. 4 is a partial longitudinally cross-sectioned view of the disconnecting panel in assembled position taken along the planes 4—4 of Fig. 3.

Fig. 5 is a partial longitudinally cross-sectioned view of the unit housing illustrating several details of its construction.

Fig. 6 is a transverse cross-sectioned view of the release mechanism taken along the plane 6—6 of Fig. 5.

Fig. 7 is an exploded perspective view of the loading wrench and nut.

Fig. 8 is a fragmentary elevational view, partly in section, of the upper portion of the unit housing illustrating the manual release and arming pins.

Fig. 9 illustrates, diagramatically, a modified disconnecting panel connected to an expendable fuel tank on an airplane.

Fig. 10 is an exploded longitudinally cross-sectioned view of the separated units forming the disconnecting panel shown in Fig. 9.

Fig. 11 is a rear elevational view of the supported unit taken in the plane 11—11 of Fig. 10 with the release pin in position.

In Fig. 1, we have illustrated diagrammatically a missile 5, supported on guide rails 6. The disconnecting panel 7, forming the subject of our invention is attached to the side of the missile. A conduit 8 leads from the panel to a supporting structure 9 from which the electrical leads extend to the missile control station, not shown.

Our panel disconnect consists of a retained and an expendable unit. The expendable unit 10 in Fig. 2 comprises an annular flanged metal frame 11 having an inner flange 12, outer flange 13 and a vertical flange 14, with spaced threaded bosses 15 on the inner flange to receive attaching bolts 16 to secure the supporting plate 17 thereto, and attaching bosses 18 on the outer flange to enable the frame to be secured to the missile. Plate 17 of hard insulating material, preferably a phenol composition, supports a plurality of conventional electrical connector halves 20, 21 and 22 extending therethrough, of varying sizes to accommodate different size electrical conductors. The connectors are seated in recesses 23 in plate 17 and secured therein by lock snap rings 24, each connector having an outer socket portion 25 to which is soldered or otherwise attached the electrical conductors, not shown. Centrally positioned in the plate is aperture 26 having a shoulder to receive knurled press fitted locking plate 27 provided with a key-hole slot 28, as shown in Figure 3, and at each corner of the plate are provided spring receiving sockets 29.

As shown in Figure 4, the retained unit 19 is housed in an enclosure 30, which may be made of aluminum, having at its base portion an annular step 31 to receive sealing gasket 32 and an annular step 33 to receive supporting plate 34 mounted thereto by bolts 35 and threaded bosses 36 integral with the base portion. Plate 34 is of the same material and configuration as plate 17, and is provided with a plurality of electrical connector halves 37, 38 and 39 aligned to receive their counterpart complementary connectors 20–22 inclusive and secured in the plate in the same manner. The connector halves are also provided with socket portions 40 to which are attached the electrical conductors, not shown, of the conduit 8.

Centrally located aperture 41 in supporting plate 34, is aligned with aperture 26 in the expendable plate 17. Four corresponding sockets 42 at each corner of the plate 34, are provided with central studs 43 to which are secured one end of springs 44, the free end of the springs adapted to be seated and compressed in sockets 29 of the expendable plate when the units are locked together. The springs function to force the expendable unit from the retained unit when the plate is released, as shown in Fig. 2.

As shown in Fig. 2, conduit 8 is attached to the enclosure 30 by a conventional clamp 45 threadedly secured to entrance 46 in the enclosure. A supporting cable, not shown, is contained inside the conduit and is secured to the anchor arm 47, see Fig. 5. Thus when the expendable unit is liberated, the conduit supports the weight of the retained unit relieving strain on the electrical connections, reinforced by the supporting cable.

Formed within the enclosure 30 is the housing 49 supporting the electrical control apparatus 50, and includes the bolted bottom plate 51 and cover plate 52. The electrical control apparatus, which may be a solenoid is provided with a shaft 54. A rotary type of solenoid is employed, the details of which are descrbed in detail in Patent 2,430,940. To the solenoid is affixed a key 55 which operates within a longitudinal slot 56 formed inside the housing, allowing the solenoid to travel longitudinally without rotating. When the solenoid is energized from a remote control station, the solenoid moves longitudinally in the slot 56 which movement is converted to a predetermined motion of 45 degrees in the shaft 54, sufficient to release the two units 10 and 19.

The lower end of the solenoid shaft extends through apertures 41 and 26 in the two plates, as shown in Fig. 4, and has a reduced end portion 57 which extends through keyhole slot 28 in the locking plate 27, and terminates in a transversely extending cross pin 58, having a shape corresponding to the slot 28 when inserted therein forming a locking means. When the solenoid shaft is rotated to a position where the pin is out of alignment with the slot, the panels are locked together.

As shown in Fig. 5, the upper end of the solenoid shaft extends into a dome shaped cap 59, bolted to the cover plate 52 and supported therein by thrust roller bearing 60, the end provided with a threaded portion 61 on which is rotatably positioned a loading nut 62, as shown in detail in Figure 7. The nut 62 is annular in shape and has diametrically positioned pins 63 projecting therefrom. Loading wrench 64 is provided with handle rod 65 at one end, which is positioned externally of the enclosure 30, and has a shoulder 66 abutting the flange 67, of cap 59. A centrally bored aperture 68 in wrench 64, loosely receives the threaded end 61 of the shaft. At the inner end of the wrench are formed split projecting ears 69 providing diametrically positioned angular recesses 70 of 45 degrees into which project the pins 63 of the loading nut. This split construction of the loading wrench permits the shaft 54 to back off 45 degrees without requiring any movement of the handle, which is sufficient rotation to permit release of the units.

Bearing washer 71 is positioned between the loading nut 62 and the thrust bearing 60. The housing is sealed by cementing the faces between the cap 59, cover plate 52 and the top of the enclosure. Packing ring 72 is additionally provided in the cap 59 to insure a complete weatherproof installation.

As is shown in Figs. 5 and 6, lever 73 is keyed to the solenoid shaft adjacent the bottom plate 51 and is restricted in its longitudinal movement on the shaft by retaining plate 74 and spacer rings 74a, each bolted to the bottom plate. An insulating sleeve 53 is loosely positioned around the solenoid shaft 54 seated at one end in an adapter bushing 51a mounted in the bottom plate, and at the other end in a circular recess 34a in the plate 34 as shown in Fig. 4. The sleeve 53 functions to prevent any short circuit conditions between the solenoid and cable conductors and also permits unrestricted movement of the solenoid shaft should the housing be packed with a moisture absorbing material to prevent corrosion within the enclosure.

As shown, the lever 73 is in a position to lock the panels together. A 45 degree clockwise rotation of the lever will cause the shaft to rotate allowing pin 58 to release the units. A manual release mechanism 75 as shown in Fig. 6, is provided should the electrical control fail to operate. It comprises a spring loaded plunger 75a positioned at one side of the lever 73 having a centrally bored recess 75b to seat a compression coil spring 76 retained in the enclosure by threaded retainer bolt 77. The inner end of the plunger is provided with an annular groove 78 into which is adapted to project the inner end of a transversely positioned release pin 79, the details of which are shown in Figure 8, which has a ring portion 79a extending beyond the enclosure to which may be attached a lanyard, not shown. The release pin when withdrawn, will cause the spring loaded plunger to actuate the lever 73 and solenoid shaft through an angle of 45 degrees to release the units. This can only be accomplished however when the arming mechanism 80 has been set. This mechanism is mounted on the same axis as the manual release mechanism 75, but on the opposite side of the enclosure. The arming mechanism comprises a rod 81 having at its inner end a head portion 82 which bears against the side of the lever 73 opposite the plunger 75a, and a knob 83 which extends externally of the enclosure. The packing ring 84 is retained in position by threaded lock nut 85. Between the knob 83, and the enclosure is positioned the arming pin 86, shown in Figs. 6 and 8, which extends through a transverse aperture 86a in the rod and seats into lug 87 of the enclosure, to lock the rod in its inner position as shown in Figs. 6 and 8, at which time the head portion 82 bears against the lever. Thus neither the solenoid nor the mechanical release mechanism can release the units, unless the arming pin is withdrawn.

The device of Figs. 1 to 8, is set for release as follows: the two units are brought into interlocking position. The loading wrench 64 is then rotated counterclockwise causing the solenoid shaft to move longitudinally by the rotation of threaded loading nut 62 until the shaft is fully extended; the solenoid moving longitudinally in the slot 56 in the housing. The arming pin 86 and release pin 79 are removed and the spring loaded plunger 75a is free to rotate the lever 73 and solenoid shaft clockwise 45 degrees, forcing the rod 81 out of the housing. The cross pin 58 on the end of the solenoid shaft is now aligned with the key hole slot 28 in the locking plate 27 of the expendable unit and the units are in a position to be locked.

The arming rod 81 is then pressed into the enclosure rotating the lever 73 counterclockwise compressing the spring 76 of the plunger 75a and rotating the solenoid shaft 45 degrees and the cross pin 58 out of alignment with the keyhole slot. If the mechanical release pin is properly seated in the groove 78 of the plunger, the units will remain locked together when the arming rod is released. The arming pin is always inserted into aperture 86a if the device is not ready for use.

The loading handle is then rotated clockwise longitudinally to withdraw the solenoid shaft into the enclosure to compress the springs 44 and firmly secure the units together; the vertical flange 14 of the retained plate frame compressing the sealing gasket 32 to obtain a watertight assembly. When the retained unit is assembled to the expendable unit, the springs 44 are compressed without imparting any thrust to the expendable unit which is an important consideration when the expendable unit is mounted on a guided missile, for any thrust might disturb the ballastic setting of the missile.

To arm the device pin 86 is removed and the arming rod withdrawn from the enclosure to its extended position, as shown by dot-dash lines in Fig. 8.

The units may be released electrically by applying a voltage to the solenoid; a voltage of 22 volts and 6 to 7 amperes having been found to be satisfactory. The energized solenoid moves downward longitudinally in the housing slot causing a 45 degree rotation of the solenoid shaft, freeing cross pin 58 from the keyhole slot, releasing the units which are propelled away from each other by springs 44, breaking the electrical connections, as shown in Fig. 2. The split construction of the loading wrench permits the loading nut and solenoid shaft to rotate freely in the loading wrench the necessary 45 degrees to permit the units to be released and thus avoid any locking action where the loading wrench may be frozen or bound into position because of weather conditions.

If, for any reason, the solenoid should fail to release the panels, release may be accomplished by the auxiliary mechanical control in which case release pin 79 may be pulled longitudinally from the enclosure as shown in the dot-dash lines in Fig. 3, by a lanyard releasing the spring loaded plunger 75a to mechanically rotate the lever 73, and the solenoid shaft clockwise 45° degrees to align the cross pin 58 with the keyhole slot, allowing the springs to separate the units as previously described.

In Figures 9 to 11 inclusive is shown a modification of our disconnecting panel adapted for use with an airplane expendable fuel tank as shown at 88 in Fig. 9 supported at 89 to the airplane structure 90. This modification differs primarily from the device as illustrated for guided missiles and as previously described, in the omission of the electrical means for disconnecting the units.

Similar to the application of the device for guided missiles, the modified disconnecting panel consists of a retained unit 91 and an expendable unit 92.

The retained unit 91 comprises a mounting plate 93 bolted to a bracket 94 supported by screws 95 to the airplane structure 90. The details of the retained plate are similar to plate 17 shown in Fig. 4 in that the plate may be composed of a similar insulating material and supports a plurality of connector halves 96, which may be of different sizes depending on the conductor to be accommodated, having socket portions 97 to which are attached the bared ends of conductors, not shown, which lead to the controls within the airplane. Shouldered aperture 98 centrally positioned in the retained unit receives a retaining pin 99 having a transversely drilled aperture 100 aligned with a longitudinal groove 101 on the inside face of the retained unit to receive disconnecting pin 102. Spring receiving sockets 103 are provided in each corner of the retained unit.

The expendable unit 92 comprises a supporting plate 104, of a size slightly larger than plate 93, secured to the enclosure 105 by screws 106. Tab 107 secured within the housing by screws 108, extends into slot 109 of the expendable unit for aligning the units to the enclosure. Mounted in the supporting plate 104 are a plurality of connector halves 110, similar to plate 34 in Fig. 4, to receive the counterpart connector halves 96. Socket portions 111 on each connector half are soldered or otherwise attached to the bared ends of conductors 112 leading to the power units in the fuel tank. The conductors 112 enter the enclosure at cable entrance 112a and are secured thereto by a threadedly attached conventional clamp 112b.

Coiled springs 113 are attached at one end to studs 114 mounted in sockets 115 in each corner of the plate 104; the free ends of the springs being seated and compressed within the sockets 103 of the retained plate when the units are mated. The units are locked together by clamping stud 116 extending through the enclosure 105, having at one end a socket 117, freely extending through a central aperture 118 in the plate 104. The socket 117, having a transversely drilled aperture 119, extends into the shouldered aperture 98 in the retained plate and around the pin 99; the aperture 119 being aligned with aperture 100 in pin 99 so that the disconnecting pin 102 can extend therethrough to lock the units together. The opposite end of stud 116 extends through the back wall of the enclosure and is threaded to receive a locking wing nut 120 having a locking wire 121 by which the nut can be secured to a lug 122 on the enclosure.

The pin 102 is attached by a lanyard 123 to the expendable fuel tank and is of a shorter length than the cable conductors, as shown in Fig. 9, so that the weight of the fuel tank, when jettisoned, will pull the pin from the panel to release the units and permit the springs to eject the unit attached to the tank free of the retained unit and break the electrical connections before a tension is applied to the conductors.

The modification of our disconnecting panel shown in Figures 9–11 inclusive is set for release by loosening the wing nut 120 and extending the end of the clamping stud 116 out of the enclosure, aligning the aperture 119 with aperture 100 of the pin 99. The disconnecting pin is then inserted into the groove 101 and through apertures 119 and 100 to lock the units together. The wing nut 120 is tightened to draw the expendable unit to the retained unit and the nut is anchored in position by wire 121.

Whereas the connections shown are all electrical in nature, it is possible to separate any type of connection, such as for example, a tubular pipe transferring liquids, etc. The devices here described are effective for use with electrical and/or mechanical connections. When used as a panel disconnect for guided missiles, we provide a retained and an expendible unit which will be forcibly separated at the time of fusing, allowing the missile to be propelled to its destination without connections projecting beyond the surface of the missile itself.

When used with an expendable fuel tank, since it would not be desirable to permit the retained unit to hang from the bottom of the plane, the unit having the housing is made expendable allowing the bottom surface of the plane to be free of projecting or dangling elements.

The expendable unit should therefore be as inexpensive as possible and in our devices, we have so provided the retained unit for the missile contains the controlling elements, such as the manual locking and unlocking elements, the electrical releasing elements, the springs for forcibly separating the units, etc.

The disconnecting panel for use with the expendable fuel tank is provided only with a mechanical release operated by the falling tank. Should it be desired to electrically control the units, the lower surface of the plane would be recessed sufficiently deep to contain a housing with electrical operating elements, as shown in retained unit for the guided missile, the expendable portion falling with the tank would contain the springs, and the extending sockets, as shown in the expendable unit for the tank.

We are enabled by the mechanism housed in our retained unit to lock the units without disturbing the missile setting; to prevent unintentioned separation of the units and to protect the mechanism from the weather.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which objects of our invention are attained, and new results accomplished, as it is obvious that the particular embodiments herein shown and described are only some of the many that may be employed to attain these objects and accomplish these results.

We claim:

1. A disconnecting coupling device comprising a pair of units, said units having complementary connecting elements for engaging each other, one pair of said elements comprising securing elements, one of said securing elements having a latch and the other having a complementary latching means, one of said securing elements including shaft-like means extending substantially centrally entirely through the unit to which it is secured and being movable in said unit, one end extending from said unit into the other unit, externally accessible tightening means for causing the units to be tightened to each other while latched to each other, the other end of said shaft-like means extending from said unit for engagement with said tightening means, compressible means between the two units for quickly separating the units when the securing elements are unlatched, and connecting means leading to said latching means and operable at a distance from the units for substantially instantly unlatching the two units.

2. A disconnecting coupling device comprising a pair of units, said units having complementary connecting elements for engaging each other, one pair of said elements comprising securing elements, one of said securing elements having a latch and the other having a complementary latching means, one of said securing elements including shaft-like means extending substantially centrally entirely through the unit to which it is secured and being movable in said unit, one end extending from said unit into the other unit, externally accessible tightening means for causing the units to be tightened to each other while latched to each other, the other end of said shaft-like means extending from said unit for engagement with said tightening means, electric actuating means encircling said shaft-like means for operating the same, compressible means between the two units for quickly separating the units when the securing elements are unlatched, connecting means leading to said electric actuating means, connecting means leading to said latching means, said connecting means operable at a distance from the units for selectively and substantially instantly unlatching the two units by said selected connecting means.

3. A disconnecting coupling device comprising a pair of units, said units having complementary connecting elements for engaging each other, one pair of said elements comprising securing elements, one of said securing elements having a latch and the other having a complementary latching means, one of said securing elements provided with an end portion extending substantially centrally from one unit to which it is secured into the other and having externally accessible tightening means for causing the units to be tightened to each other while latched to each other, said tightening means movably mounted with respect to its unit, compressible means between the two units for quickly separating the units when the securing elements are unlatched, and connecting means leading to said latching means and operable at a distance from the units for substantially instantly unlatching the two units.

4. A disconnecting coupling device comprising a pair of units, said units having complementary connecting elements for engaging each other, said complementary connecting elements comprising not less than two pairs of electrical connecting elements and one pair of securing elements, one of said securing elements having a latch and the other having a complementary latching means, one of said securing elements including shaft-like means extending substantially centrally entirely through the unit to which it is secured and being movable in said unit, one end extending from said unit into the other unit, and having externally accessible tightening means for causing the units to be tightened to each other while latched to each other, said tightening means movably mounted with respect to its unit, compressible means between the two units for quickly separating the units when the securing elements are unlatched, and connecting means leading to said latching means and operable at a distance from the units for substantially instantly unlatching the two units.

5. A disconnecting coupling device comprising a pair of units, said units having complementary connecting elements for engaging each other, one pair of said elements comprising securing elements, one of said securing elements having a latch and the other having a complementary latching means, said latch extending laterally from one side of the coupling and between the connected units, and passing through the securing elements, one of said securing elements provided with an end extending from one unit to which it is secured into the other unit and having externally accessible tightening means for causing the units to be tightened to each other while latched to each other, compressible means between the two units for quickly separating the units when the securing elements are unlatched, and connecting means leading to said latching means and operable at a distance from the units for substantially instantly unlatching the two units.

6. A disconnecting coupling device comprising a pair of units, said units having complementary connecting elements for engaging each other, one pair of said elements comprising securing elements, one of said securing elements having a latch and the other having a complementary latching means, one of said securing elements provided with an end extending from one unit to which it is secured into the other unit and having externally accessible tightening means for causing the units to be tightened to each other while latched to each other, the said end of the securing means being rotatable internally of the connected coupling less than a complete turn to separate the units, compressible means between the two units for quickly separating the units when the securing elements are unlatched, and connecting means leading to said latching means and operable at a distance from the units for substantially instantly unlatching the two units.

References Cited in the file of this patent

UNITED STATES PATENTS

| | | |
|---|---|---|
| 231,974 | Seed | Sept. 7, 1880 |
| 295,559 | Kitson | Mar. 25, 1884 |
| 860,482 | Jaeger | July 16, 1907 |
| 879,760 | Froelich | Feb. 18, 1908 |
| 967,681 | Sloan | Aug. 16, 1910 |
| 1,110,193 | Dougherty | Sept. 8, 1914 |
| 1,996,410 | Edwards | Apr. 2, 1935 |
| 2,006,436 | Bowers | July 2, 1935 |
| 2,068,399 | Dash et al. | Jan. 19, 1937 |
| 2,149,550 | Richards et al. | Mar. 7, 1939 |
| 2,203,973 | Walls | June 11, 1940 |
| 2,220,810 | Bright | Nov. 5, 1940 |
| 2,233,146 | Schwartz et al. | Feb. 25, 1941 |
| 2,271,507 | Mantz | Jan. 27, 1942 |
| 2,430,940 | Leland | Nov. 18, 1947 |
| 2,432,120 | Neill | Dec. 9, 1947 |

FOREIGN PATENTS

| | | |
|---|---|---|
| 558,103 | Great Britain | Dec. 21, 1943 |
| 571,033 | Great Britain | Aug. 2, 1945 |